Feb. 18, 1930.  R. E. McGAHEY  1,747,875
BRAKE LEVER AND ROD CONNECTION
Filed Dec. 16, 1926
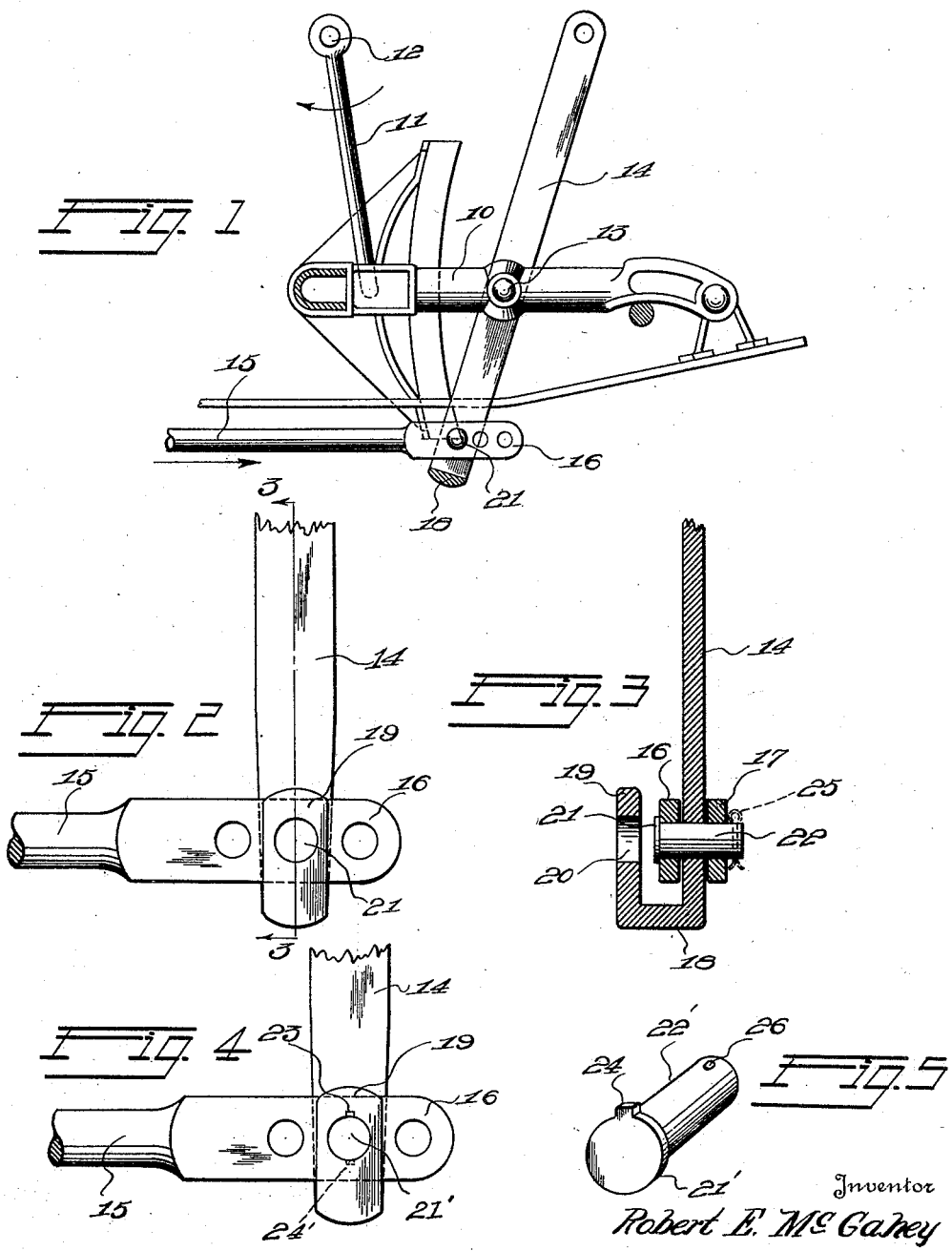

Patented Feb. 18, 1930

1,747,875

UNITED STATES PATENT OFFICE

ROBERT E. McGAHEY, OF ALEXANDRIA, VIRGINIA

BRAKE LEVER AND ROD CONNECTION

Application filed December 16, 1926. Serial No. 155,226.

This invention relates to brake lever and rod connections and has for an object to provide improved means for fulcruming together the brake lever and connecting rod with means for supporting the connecting rod in case the fulcruming pin is lost and improved means for maintaining the fulcruming pin against loss.

A further object of the invention is to provide in combination with a railway brake organization and a connecting rod a lever having a hook at its lower end underlying the connecting rod so positioned as to support the connecting rod when accidentally the fulcruming connection between the two has been interrupted.

A further object of the invention is to provide the hooked end of the brake lever with means operating as a holding means for the fulcruming pin to prevent its being accidentally lost from its proper fulcruming position.

With these and other objects in view, the invention comprises certain novel parts, elements, units, combinations, interactions and functions as disclosed in the drawings together with mechanical and functional equivalents thereof as will be hereinafter more fully described and claimed.

In the drawings:

Figure 1 is a view partly in side elevation and partly in section of a brake organization with the present invention applied thereto.

Figure 2 is a view in side elevation on an enlarged scale of the fulcrumed joint of the brake lever with the connecting rod.

Figure 3 is a sectional view through the brake lever and connecting rod taken on line 3—3 of Figure 2.

Figure 4 is a view in side elevation of a modification of the means for holding the fulcruming pin in position.

Figure 5 is a perspective view of the fulcruming pin used in connection with the modified form shown at Figure 4.

Like characters of reference indicate corresponding parts throughout the several views.

The improved brake lever and rod connection which forms the subject matter of this application is adapted for co-action with any usual and ordinary type of railway brake organization indicated as an entirety at 10 in Figure 1, such organization being suspended by a link or a plurality of links shown at 11, the supporting pivot being shown at 12. The brake organization as shown is of a well known type and is fulcrumed at 13 to a brake lever 14 corresponding to the ordinary brake lever found upon railway cars. This brake lever 14 is connected with the connecting rod 15 by being inserted between the bifurcated ends 16 and 17.

The brake lever 14 differs from the usual and ordinary brake lever, however, in being provided at its lower end with a lateral offset 18 and a return bent or hook portion 19 which is spaced away from one of the bifurcated members 16 as indicated. This hook 19 is provided with a perforation or opening 20 through which the head 21 of the fulcrum pin 22 may be driven by a drive fit, and the head 22 will then occupy the space between the hook 19 and the bifurcated member 16 and by reason of the snugness of fit between the head 21 and the opening 20 will be prevented from being accidentally displaced but may be driven backwardly as will be apparent. As a further precaution against loss, the hook 19 may be provided with a key way 23 as shown at Figure 4, and the head 21' of the bolt 22' may be provided with a key or offset 24 which will pass through the key way 23, and by reason of its weight will tend to rotate the bolt 22' to position the key at the bottom as indicated in dotted lines at 24' at Figure 4. The device as provided is continually subject to jarring and vibration which will tend to hold the bolt with the key 24 at its lowermost position while the key way 23 is at normally uppermost position.

As a further precaution, the pin 22 is provided with an opening 26 through which a cotter pin may be inserted as indicated in dotted lines at 25 but such cotter pin forms no part of the present invention and the showing in dotted lines is merely indicative of its use and forms no part of the invention or any limitation thereof.

The hook 19 and its connecting offset 18 serve not only as a means for holding the bolt in its fulcruming position but also as a means for preventing the connecting rod 15 from dropping in case of any accidental breakage or losing of the bolt 22. The mounting of the brake structure is such that it normally tends to move in the direction indicated by the arrow at Figure 1 and will, therefore, at all times hold the hook under the connecting rod 15. When the air is applied, it moves the connecting rod in the direction indicated by the arrow adjacent said rod and Figure 1, so that it still will support the connecting rod at all times.

It is well known that such connecting rods by reason of disconnecting heretofore have caused great damage both to the rolling stock and the road bed by reason of dropping. The present invention will wholly eliminate any possibility of the connecting rod dropping irrespective of the pin remaining in position or being lost or broken. The hook, therefore, serves the double purpose of a support for the connecting rod and as a means for holding the fulcruming bolt to position.

What I claim to be new is:

1. The combination of a fulcrumed brake lever depending from its fulcrum, a laterally offset and upwardly turned hook adjacent the lower end of the lever, a longitudinally and horizontally movable connecting rod having one end positioned within the hook, means pivotally connecting the lever and rod, and brake structure supplemental to the pivotal connection tending to maintain the rod within the hook.

2. The combination of a fulcrumed brake lever depending from its fulcrum, a laterally offset and upwardly turned hook adjacent the lower end of the lever, a longitudinally and horizontally movable connecting rod having one end positioned within the hook, said lever, hook and rod having concentric fulcrum openings, a bolt within the fulcrum openings pivotally connecting the lever and rod, and brake structure supplemental to the pivotal connection tending to maintain the rod within the hook.

3. The combination of a fulcrumed brake lever depending from its fulcrum, a laterally offset and upwardly turned hook adjacent the lower end of the lever, a longitudinally and horizontally movable connecting rod having one end positioned within the hook, said lever, hook and rod having concentric fulcrum openings, a pintle in some of said openings pivotally connecting the lever and rod, said pintle being provided with a head larger than the openings in which the pintle is located, and brake structure supplemental to the pivotal connection tending to maintain the rod within the hook.

4. The combination of a fulcrumed brake lever depending from its fulcrum, a laterally offset and upwardly turned hook adjacent the lower end of the lever, a longitudinally and horizontally movable connecting rod having one end positioned within the hook, said lever, hook and rod having concentric fulcrum openings, the opening in said hook being of greater diameter than the openings in the lever and rod, a pintle having a head inserted entirely through the opening of the hook and positioned within the openings of the rod and lever with the head interposed between the hook and the fulcrumed parts, and brake structure supplemental to the fulcrum tending to maintain the rod within the hook.

5. The combination with a railway brake organization comprising a connecting rod having a bifurcated end, of a brake lever inserted between the bifurcations, said lever and connecting rod having registering fulcrum openings, a hook extending laterally and upwardly from the lower end of said brake lever and offset from the proximate side of the bifurcated end of the rod, said hook being provided with a keyhole opening, a bolt proportioned to properly fulcrum the lever and connecting rod and provided with a keyed head properly proportioned to be inserted through the keyhole of the hook and to turn to locking position in the space intermediate the hook and the bifurcated end of the connecting rod.

6. In a device of the kind described, the combination with a brake lever and a connecting rod pivotally secured to the lower end thereof, of a transversely arranged extension formed with the lower end of the lever and arranged below the connecting rod for supporting the latter upon failure of the pivotal connection.

7. In a device of the kind described, the combination with a brake lever and a connecting rod pivotally secured to the lower end thereof, of a shoulder secured to the lower end of the lever and arranged beneath the connecting rod for supporting the latter upon failure of the pivotal connection.

8. In a device of the kind described, the combination with a brake lever and a connecting rod pivotally connected to the lower end thereof, of an extension formed with the lower end of the lever and arranged beneath the connecting rod for supporting the latter upon failure of the pivotal connection.

In testimony whereof I affix my signature.

ROBERT E. McGAHEY.